Sept. 24, 1935.  F. W. BILLKER  2,015,250
CUTTING MACHINE
Filed Aug. 29, 1932  2 Sheets-Sheet 1
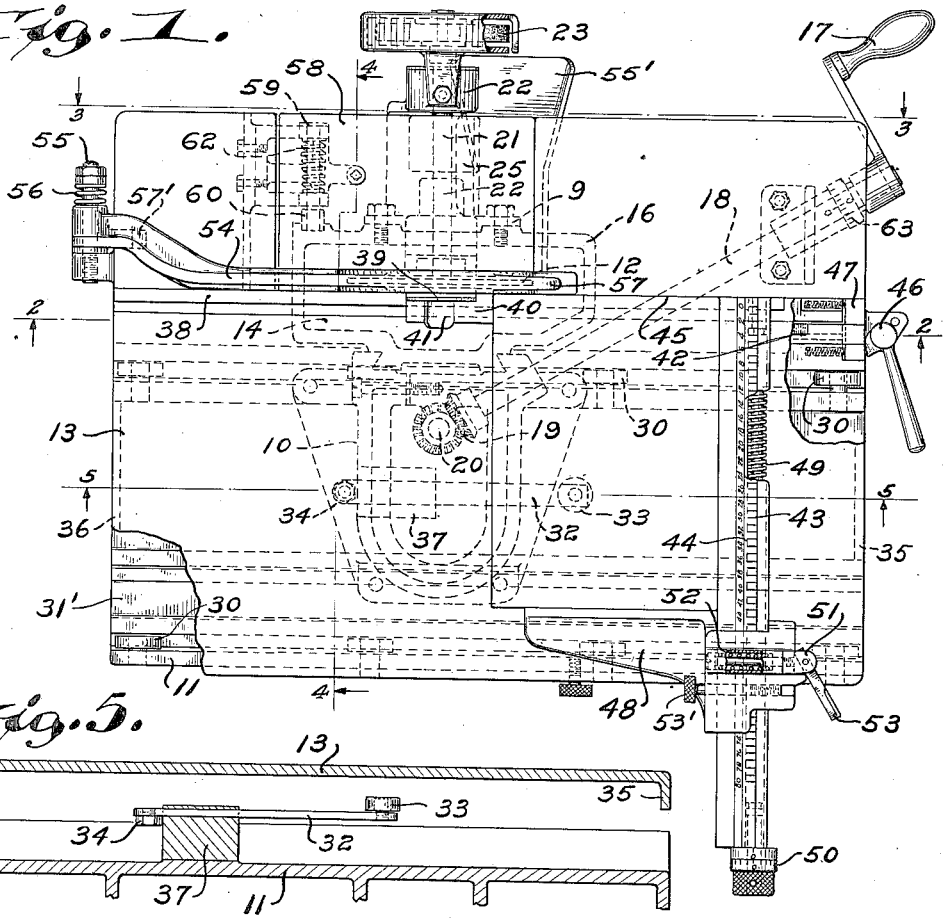
Fig. 1.
Fig. 5.
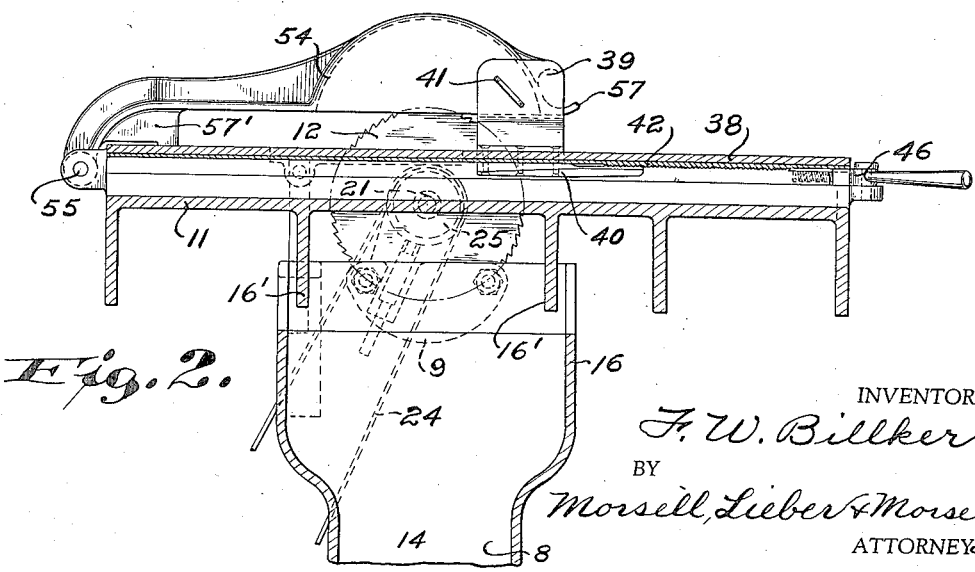
Fig. 2.
INVENTOR.
F. W. Billker
BY
Morsell, Lieber & Morsell
ATTORNEYS.

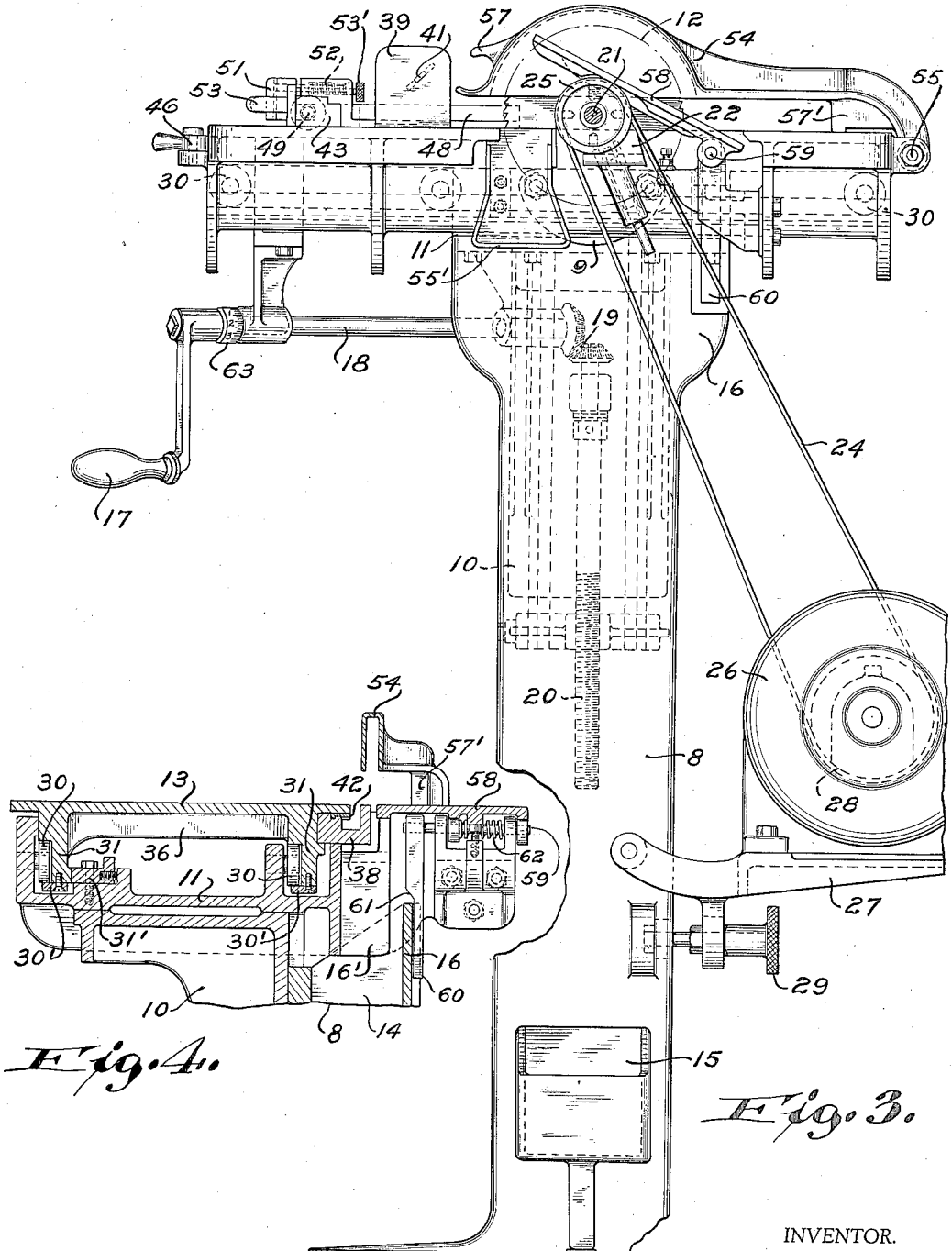

Patented Sept. 24, 1935

2,015,250

UNITED STATES PATENT OFFICE 2,015,250

CUTTING MACHINE

Fredrick W. Billker, Milwaukee, Wis.

Application August 29, 1932, Serial No. 630,753

13 Claims. (Cl. 29—69)

The present invention relates in general to improvements in cutting machines, and relates more specifically to improvements in the construction and operation of trimming mechanisms especially adapted for use in composing rooms of printing establishments to cut type, slugs, borders, plates, and the like.

Generally defined, an object of the invention is to provide a new and useful cutting machine which is simple in construction and efficient in operation.

Some of the more specific objects of the invention are as follows:

To provide improved mechanism for clamping the work in position in a cutting machine, especially adapted for composing room service, whereby maximum or minimum sizes and quantities of stock may be accurately trimmed or cut without endangering the operator, and which will eliminate waste of material due to inaccurate cutting.

To provide an improved pica gage structure for type, slug or plate trimming machines, whereby accurately cut desired lengths of stock may be rapidly and consistently produced.

To provide improved guard means for saw type trimmers, which will maintain the effective teeth of the saw concealed at all times and will thus afford greatest protection for the saw and for the attendant.

To provide an improved work supporting structure for composing room cutting machines, which will facilitate discharge of trimmings, slugs, etc., and wherein the slug discharge may be effected without disturbing the saw guard.

To provide improved structure for discharging trimmings and dust through the main supporting column of a trimming and mitering machine, which will function effectively irrespective of the position of adjustment of the work support.

To provide improved table elevating and lowering mechanism for saw trimmers or the like, which is readily accessible for manipulation and which may be conveniently operated to quickly adjust the table.

To provide improved adjusting mechanism for producing accurate under-cuts of any desired depth.

To provide improved means for supporting the work supporting table of a trimming and cutting machine and for preventing tilting, over-travel, or mis-alinement thereof.

To provide various other improvements in the details of construction and in the mode of manipulating cutting and trimming machines for composing room service, whereby the construction thereof is simplified and strengthened whereas the operation and use is made far more flexible, safe, accurate and speedy than in prior machines of this kind.

These and other objects and advantages will be apparent from the following detailed description.

A clear conception of embodiments of the several features of the improvement, and of the construction and mode of operating saw trimmers built in accordance therewith, may be had by referring to the drawings accompanying and forming a part of this specification in which like reference characters designate the same or similar parts in the various views.

Fig. 1 is a top view of one of the improved saw type of trimming machines for type, plate, borders, slugs and the like, with portions thereof broken away to expose normally concealed details;

Fig. 2 is a transverse vertical section through the upper portion of the trimming machine, taken along the line 2—2 of Fig. 1;

Fig. 3 is a part sectional side elevation of the improved machine, looking toward the slug discharge end thereof, the section being taken along the line 3—3 of Fig. 1;

Fig. 4 is another transverse vertical section through the upper part of the machine, taken along the line 4—4 of Fig. 1; and Fig. 5 is a sectional view showing the improved table stop mechanism, the section being taken along the line 5—5 of Fig. 1.

The improved cutting machine specifically shown in the drawings by way of illustration, comprises in general a composite main frame formed of inter-related sections 8, 9, 10, 11, a rotary cuter or saw 12 journalled upon the upper fixed frame section 9, and a work support or table 13 movably mounted upon the upper adjustable frame section 11 and slidable in proximity to the saw 12.

The lower or base section 8 of the frame is constructed in the form of a hollow column having a vertical passage 14 therein extending from the saw 12 to a removable receptacle 15 which is adapted to catch the cuttings and dust precipitated downwardly through the internal passage 14. The upper portion 16 of the base section 8 is widened in the direction of extent of the saw 12 so as to insure delivery of all of the cuttings into the passage 14, and the upper fixed section 9 of the frame is firmly attached directly to the widened portion 16. The saw receiving portion of the upper adjustable frame section 11 is provided with depending aprons 16' for deflecting cuttings from the saw 12 into the passage 14. The sub-section 10 of the main frame is slidably associated with parallel dove-tail guides associated with the column of the base section 8, and is vertically adjustable along these guides by means of a crank 17 attached to a rotary shaft 18 which coacts through bevel gearing 19 with an upright jack shaft 20 cooperating with the frame sections 8, 10. The upper movable frame section 11 rests upon and is firmly secured to the sub section 10, being vertically adjustable therewith relative to the fixed sections 8, 9.

The rotary saw 12 may be of the usual type having peripheral teeth and lateral trimming projections, and is mounted upon an end of a shaft 21 supported in journal bearings 22 carried directly by the upper normally fixed frame section 9. The saw shaft 21 may have an abrasive dressing wheel 23 secured to its opposite outer end, and is driven by a belt 24 coacting with a pulley 25 carried by the medial portion of the shaft 21 between the bearings 22. The driving motor 26 for the saw 12, may be supported from the base section 8 by means of an adjustable bracket 27, and has a pulley 28 coacting with the belt 24 as shown in Fig. 3. The tension of the belt 24 may be varied by adjusting the bracket 27 with the aid of a hand wheel 29, and it should be noted that the axis of rotation of the saw 12 is fixed relative to the frame sections 8, 9. The shaft 21 may also be locked against rotation to permit removal of the saw therefrom.

The work supporting table 13 is movably supported upon a series of rollers 30 horizontally journalled in the upper frame section 11, and has a top surface which lies in the plane of the uppermost side portion of the upper frame section 11 as shown in Figs. 3 and 4. The rollers 30 coact with parallel runways formed between depending ribs 31 of the table 13 and strips 30' coacting therewith, and the work table is movable forwardly or rearwardly until its edges are disposed laterally adjacent to the side of the saw 12, without causing tilting, jamming, or misalinement of the table. Such tilting is prevented by the constant coaction of at least four of the rollers 30 with the horizontal parallel runways of the ribs 31, and the horizontal sliding motion of the table is limited by a special stop shown in Figs. 1 and 5 consisting of horizontally slidable link 32 having front and rear buffers 33, 34, the former of which is alternatively with the front and rear table flanges 35, 36 and the latter of which is engageable with a lug 37 rigidly attached to the upper frame section 11. This sliding stop assists in stabilizing the table when moved forwardly, and the frictional resistance offered by the link 32 gradually arrests the movement of the table in either direction. The side of the table 13 adjacent to the saw 12, has a guide rail 38 attached thereto to form an L-shaped recess as shown in Figs. 2 and 4. The table 13 is also urged away from the saw plane so as to eliminate undesirable side play, by means of a spring pressed guide 31' coacting with one of the ribs 31. The saw 12 is operable in a plane closely adjacent to the outer side face of the rail 38, and a movable clamp 39 having a lower shoe 40 slidable within the recess formed by the rail 38, is also shiftable with or independently of the table 13, in close proximity to the plane of the saw 12, this clamp having a grip lug 41 projecting therefrom away from the saw plane and adapted to be engaged by the fingers of the operator. The upper portion of the shoe is notched for locking coaction with lower notches formed on a sliding locking bar 42, the latter being slidably confined in a groove formed between the rail 38 and the adjacent edge of the table 13, as illustrated in Fig. 4. The formation of the clamp shoe 40 is such that when the lug 41 is released, gravity acting upon the clamp 39 will cause the notches of the shoe 40 and bar 42 to interlock, but when upward pressure is applied manually by the operator to the lug 41, the shoe notches are released and the clamp 39 may be freely manually shifted along the rail 38.

Secured to the forward top portion of the table 13, is a pica gage bar 43 normally disposed at right angles to the plane of the saw 12 and having graduations 44 upon the upper face thereof. A piece of work such as a plate 45, or a series of type or border bars, may be clamped to the side of the bar 43 facing the saw 12, while resting upon the table 13, by means of the clamp 39 and bar 42. The front end of the frame section carries a manually operable locking cam 46 cooperable with a spring pressed plate 47 associated with the front end of the bar 42. In order to definitely position the work or plate 45 longitudinally of the gage bar 42, this bar is provided with an adjustable bracket 48 slidably engaging the bar 42. The bracket 48 may be advanced slowly along the bar 42 by means of an adjusting screw 49 having a vernier gage 50 associated with one end thereof, and may also be quickly shifted along the bar 42 upon release of the bracket 48 from the screw 49. The releasing mechanism for connecting and disconnecting the bracket 48 to and from the screw 49, comprises a spring pressed block 51 urged into engagement with the screw threads, by a spring 52, and capable of being retracted out of engagement with said threads, by means of a lever 53. When the block 51 engages the threads of the screw 49, the bracket 48 is held in fixed position relative to the bar 42 and table 13, and additional locking means in the form of a clamping screw 53' may be provided for preventing adjustment of the vernier gage 50 and for eliminating play.

The saw 12 is normally covered and protected by a guard 54 which is swingably supported from the rear portion of the upper frame section 11, by means of a pivot 55. A spring 56 embracing the pivot 55, engages the guard 54 and serves to hold the guard fixedly up or down. The front of the guard 54 may also be provided with a lifting lug 57 so as to permit convenient lifting of the guard away from the saw 12. When the upper frame section 11 is moved vertically relative to the saw 12, the guard 54 does not swing about its pivot 55, but is held in fixed position relative to the section 11 by a stop 57' near the pivot 55. Adjustment of the table 13 and frame section 11, therefore, will not materially affect the extent of coverage of the saw 12 by the guard 54.

The limits of vertical adjustment of the upper frame section 11 relative to the saw 12, are, however, preferably such that either plate or slugs may be cut, and when the machine is to be utilized for the latter service, the relatively large pieces removed from the stock are preferably discharged independently of the passage 14 and receptacle 15. For this purpose, a slug discharge chute 55' is provided at the side of the frame section 9, and a portion 58 of the upper section 11 is made automatically removable during lowering of the table 13 and section 11, to open a passage leading to the chute 55'. The frame portion 58 is mounted upon a pivot pin 59 which is attached to a guide bar 60 in such a manner that when the portion 58 swings upwardly due to engagement with the saw shaft bearing 22, to the position shown in Fig. 3, it is simultaneously moved away from the saw 12 sufficiently to prevent striking the side wall of the guard 54. This lateral sliding of the frame portion 58 during lowering, is effected by engagement of an inclined surface 61 of the bar 60 with the end of the column portion 16 as will be apparent from Fig. 4, and the return sliding during elevation of the frame section 11 is caused by a spring 62 embracing the pivot pin 59. It will be apparent that while the frame portion 58 when elevated, provides an amply large passage for slugs communicating with the chute 55', this portion when lowered, provides a horizontal plane surface in line with the top of the table 13 on the side of the saw 12 remote from the table.

The crank handle 17 normally serves to raise and lower the upper frame sections 10, 11 and the table 13, as previously indicated, and by virtue of the disposition of the shaft 18 at an angle as shown in Fig. 1, the handle 17 is conveniently accessible for manipulation by an operator standing in front or at the saw side of the machine, even when the table 13 is moved forward as far as possible. In order to permit accurate vertical adjustment of the work supporting table 13 for undercutting, the shaft 18 is provided with gage mechanism 63 which permits raising or lowering of the work, any predetermined distance from a fixed plane. When it is desired to undercut a piece of work such as a plate 45, the table 13 is first set so that the lower face of the overhanging end of the plate 45 will just touch the uppermost portion of the saw 12. The gage mechanism 63 may then be set to "0" and the desired depth of the undercut can be accomplished by means of the crank handle 17 which can be operated to lower the table 13 and the piece of work to proper horizontal position preparatory to producing the undercut.

When the cutting machine is being utilized to saw plates, et cetera, the table 13 is adjusted vertically to bring the top face of the frame portion 58 into the horizontal plane of the table 13, and the saw 12 then projects a sufficient distance above this horizontal plane, to effectively saw the ends of the pieces of work advanced toward and past the saw by manual shifting of the table 13. During such cutting, the work is firmly attached to the table 13 in proper position, by the clamp 39 and bracket 48, and the guard 54 while permitting the work to be slid therebeneath, protects both the saw and the operator on both sides of the saw. Because of the location of the clamp 39 at the side of the gage bar 43 facing the saw 12, and the disposition of the bar 43 near the front of the table 13, obviously make it possible to handle pieces of work of maximum size without manual holding, since the clamp can be locked at any point along the table 13. The table 13 is confined to movement parallel to the plane of the saw 12, by the rollers 30, ribs 31, and the guide 31' which forces the adjacent rib 31 against the end wall of the frame section 11, and is prevented from tilting by the strips 30' and ribs 31 coacting with the rollers 30, and also by the limit stop mechanism of Fig. 5.

During such cutting and trimming, the material removed by the saw 12, including the cuttings and dust, is delivered downwardly by the aprons 16' through the passage 14 and into the receptacle 15 from which it may be periodically removed.

When the machine is to be utilized for sawing slugs into lengths, the upper frame 11 and table 13 may be lowered relative to the saw 12, to cause the frame portion 58 to assume the position shown in Fig. 3, thereby providing a direct passage for delivering the cut lengths upon the chute 55'. The slug stock may be advanced along the gage bar 43 by shifting the bracket 48 toward the plane of the saw 12, and the clamp 39 may again be employed to hold the stock during sawing. While the cut slugs are delivered to the chute 55', the finer cuttings and dust are again discharged past the aprons 16' through the passage 14.

The machine may also be utilized for undercutting in the manner previously described with the aid of the gage mechanism 63, and is adapted to cooperate with standard mitering attachments and line-up gages. It will be apparent from the foregoing description, that the improved cutting machine, while being of relatively simple and compact construction, is also highly flexible and efficient in operation. The various adjustments may be readily made to produce accurate results, and the mechanism is both safe and fool-proof in operation.

It should be understood that it is not desired to limit the invention to the exact details of construction herein shown and described, for various modifications within the scope of the claims may occur to persons skilled in the art.

It is claimed and desired to secure by Letters Patent:

1. In combination, a cutter, a guard for said cutter, and a work support adjustably cooperable with said cutter, said support having a section movable laterally away from said cutter to clear said guard during relative adjustment of said support and cutter.

2. In combination, a cutter, a guard for said cutter, and a work support adjustably cooperable with said cutter, said support having a pivotally mounted section movable laterally away from said cutter to clear said guard during relative adjustment of said support and cutter.

3. In combination, a frame, a rotary cutter journalled in said frame, a slug discharge chute secured to said frame adjacent to and extending downwardly and laterally away from said cutter, a work support movable toward and away from said chute, and a movable section cooperating with said support to effect delivery of cuttings either directly into said chute or over the same in the plane of said support.

4. In combination, a rotary saw, a frame having a vertically movable portion extending into close proximity to said saw, a guard having a wall adjacent to the side of said saw facing said movable frame portion, and means for moving said frame portion to clear said guard wall during vertical movement of said portion.

5. In combination, a rotary cutter, a guard cooperating with said cutter, a work support adjustably cooperable with said cutter, said support having a section movable laterally away from said cutter to clear said guard during relative adjustment of said support and cutter, and resilient means for urging said movable section toward said cutter.

6. In combination, a rotary cutter, a frame having an upwardly movable portion extending into close proximity to said cutter, a guard having a wall at the side of said cutter facing said movable frame portion, means for moving said frame portion laterally away from said cutter to clear said guard wall during upward movement of said frame portion, and resilient means for urging said frame portion toward said cutter.

7. In combination, a cutter, a work support adjustably cooperable with said cutter, and a guard for said cutter pivotally mounted upon said support, said support having a section pivotally associated therewith and movable laterally away from said cutter to clear said guard during relative adjustment of said support and cutter.

8. In combination, a cutter, a work support vertically adjustable relative to said cutter, and a guard for said cutter pivotally associated with said support rearwardly of the cutter, said support having a section pivotally associated therewith rearwardly of said cutter and movable laterally away from said cutter to clear said guard during relative adjustment of said support and cutter.

9. In combination, a frame, a rotary cutter journaled in said frame, a work support having a section disposed at one side of said cutter and movable out of the plane of support of the work to open a gap in said support, and a slug discharge chute secured to said frame adjacent to the gap and extending downwardly and laterally away from said cutter.

10. In combination, a rotary cutter, a guard for said cutter, a work support adjustable relative to said cutter, said support having a section movable away from said cutter to clear said guard, and resilient means for urging said movable section toward said cutter.

11. In combination, a cutter, a frame having a portion movable in close proximity to said cutter, a guard having a wall at one side of said cutter, means for moving said frame portion laterally away from said cutter to clear said guard wall, and resilient means for urging said frame portion toward said cutter.

12. In combination, a rotary cutter, a work support having a section at one side of said cutter swingable out of the plane of support of the work to open a gap in said support, a guard for said cutter, both said swingable work support section and said guard being pivoted rearwardly of the cutter, and a slug discharge chute disposed adjacent said gap and extending downwardly away from said cutter and laterally relative to the plane of cutting.

13. In combination, a rotary cutter, a work support having a section at one side of said cutter swingable out of the plane of support of the work to open a gap in said support, a guard disposed over said cutter adjacent to said swingable work support section, both said swingable work support section and said guard being pivoted rearwardly of said cutter and said cutter and work support being relatively vertically movable to effect swinging of said swingable work support section and guard about their pivots, and a slug discharge chute disposed adjacent said gap and extending downwardly away from said cutter and laterally relative to the plane of cutting.

FREDRICK W. BILLKER.